(12) United States Patent
Capellari et al.

(10) Patent No.: US 7,181,920 B2
(45) Date of Patent: Feb. 27, 2007

(54) COOLING PLANT FOR A FLUID WITH CONTROL OF VARIABLES

(75) Inventors: Giovanni Battista Capellari, Udine (IT); Filippo Trombin, Verona (IT); Fabio Massaro, Verona (IT)

(73) Assignee: Officine Meccaniche Industriali Srl, Monfalcone (GO) (IT)

( * ) Notice: Subject to any disclaimer, the term of this patent is extended or adjusted under 35 U.S.C. 154(b) by 0 days.

(21) Appl. No.: 11/206,764

(22) Filed: Aug. 19, 2005

(65) Prior Publication Data

US 2006/0042279 A1 Mar. 2, 2006

(30) Foreign Application Priority Data

Aug. 31, 2004 (IT) .......................... UD2004A0171

(51) Int. Cl.
*F25D 17/00* (2006.01)
*F25B 39/04* (2006.01)

(52) U.S. Cl. ....................... 62/181; 62/183; 62/DIG. 17

(58) Field of Classification Search .................. 62/181, 62/183, 184, DIG. 17, 177, 185
See application file for complete search history.

(56) References Cited

U.S. PATENT DOCUMENTS

| | | | |
|---|---|---|---|
| 1,688,881 A | 10/1928 | Replogle | |
| 3,354,665 A | 11/1967 | Lewis | |
| 3,633,376 A | 1/1972 | Miner | |
| 4,474,022 A | 10/1984 | Puskar | |
| 4,974,420 A * | 12/1990 | Kramer | .................. 62/181 |
| 5,040,377 A | 8/1991 | Braun et al. | |
| 5,058,390 A * | 10/1991 | Sindermann et al. | .......... 62/184 |
| 5,138,844 A * | 8/1992 | Clanin et al. | .................. 62/183 |
| 5,150,581 A * | 9/1992 | Smith | ................... 62/DIG. 17 |
| 5,600,960 A | 2/1997 | Schwedler et al. | |

FOREIGN PATENT DOCUMENTS

| | | |
|---|---|---|
| DE | 489653 | 1/1930 |
| DE | 2451361 | 5/1976 |
| JP | 02208455 | 8/1990 |
| JP | 06281264 | 10/1994 |
| JP | 07158979 | 6/1995 |
| JP | 2002130847 | 5/2002 |
| JP | 2003294327 | 10/2003 |

OTHER PUBLICATIONS

Extended European Search Report dated Jun. 6, 2006 from corresponding European Patent Appln. No. 05107874.9-2301.

* cited by examiner

*Primary Examiner*—Marc Norman
(74) *Attorney, Agent, or Firm*—Stevens, Davis, Miller & Mosher, LLP

(57) ABSTRACT

Cooling plant for a "cooled" fluid, able to cool and/or dry the fluid by means of cooling substantially to a pre-established temperature, the plant comprising a heat exchanger (17), to cool the fluid, by means of heat exchange with a "cooling" fluid inserted in a cooling unit (11) comprising a cooling circuit (13) able to feed the cooling fluid to the heat exchanger (17), the cooling unit (11) comprising at least a condensation device (15), able to take the cooling fluid to within desired parameters of pressure and/or temperature. The plant also comprises regulation means (19) able to detect the temperature of the fluid to be controlled, and to act on the condensation device (15) in order to vary the parameters of pressure and/or temperature of the cooling fluid.

8 Claims, 1 Drawing Sheet

COOLING PLANT FOR A FLUID WITH CONTROL OF VARIABLES

This application claims the priority of Italian Patent Application No. UD2004A000171 filed on Aug. 31, 2004.

FIELD OF THE INVENTION

The present invention concerns a cooling plant, able to be used in applications where it is necessary to remove heat from a fluid.

The plant according to the invention is able to cool and/or dry a fluid which we shall indicate as "cooled", for example, but not only, compressed air, by means of cooling it substantially to a pre-established temperature using a second fluid which we shall indicate as "cooling", and to allow, by means of a particular innovative solution, to maintain the pre-established temperature constant even when, inside the functioning limits, there are variations in the delivery and/or pressure and/or temperature of the two fluids, and in the ambient temperature.

The invention is advantageously applied not only in driers for compressed air, but also for industrial, commercial or residential cooling plants, or any other similar or comparable application.

BACKGROUND OF THE INVENTION

Applications are known in which it is necessary to have a cooled and/or almost totally dry fluid, in both distribution plants and in user machines.

Among the most widespread known cooling plants there are those in which the fluid is cooled by means of a cooling circuit comprising at a heat exchanger, called evaporator, which by means of a direct or indirect heat exchange, has the function of cooling the fluid to be cooled to the desired temperature or, in drying plants for compressed air, to make the water present in the fluid condense due to cooling, and then allow to separate the water from the fluid by means of suitable separator devices, to subsequently discharge it through suitable discharge devices.

The cooling circuit of said plants generally consists of a cooling compressor, a condenser, a expansion member and said evaporator.

The condenser can be for example, but not only, of the static type, with a finned battery, a finned battery with forced cooling using an electroventilator, with a bundle of pipes with water cooling, or other.

The expansion member can be for example, but not only, an expansion valve, a capillary, a capacity regulation valve, a thermostatic valve, an electrovalve, or other.

These components are suitably sized so as to guarantee, to the nominal conditions of delivery, pressure and temperatures, an effective cooling of the fluid to a pre-established temperature.

In such known plants, to prevent the cooling conditions determined by the plant from becoming excessive or insufficient as the characteristic parameters of the fluid to be cooled vary, two different control techniques are mainly used. A first technique, typical of domestic refrigerators, provides to switch off the cooling unit until the correct conditions of refrigeration have been restored, and then restart the cooling unit when it reaches a pre-established threshold for re-starting refrigeration.

A second technique provides to install at least a device able to limit the cooling capacity, such as for example a capacity regulation valve or hot gas by-pass system, or a system to control the speed of rotation of the compressor, or others. The function of these devices is to choke the flow of cooling fluid in the event that a modification is detected in one or more significant parameters of the fluid to be cooled.

However, the two known techniques entail various difficulties in management and coordination, stress to the motors, and slow response times, while the second technique also implies high costs of production and maintenance.

It is also known to provide systems to measure the pressure/temperature of the cooling fluid circulating both at outlet from the condenser and also at outlet from the expansion member, associated with intervention means such as thermostats or pressure switches, the function of which is to keep the pressure values constant, inside a pre-determined range, in said two points of the circuit. In this way, however, apart from having to intervene in two points with problems of reciprocal coordination, in any case there is a delay both in the intervention and also in achieving the effects of the intervention.

SUMMARY OF THE INVENTION

The present invention is set forth and characterized in the main claim, while the dependent claims describe other innovative characteristics of the invention.

A purpose of the present invention is to achieve a cooling plant for a fluid which is easy and economical to make, and which allows to keep constant the temperature of the fluid concerned, irrespective of its quality, its temperature and the environmental conditions in which said fluid to be cooled is found.

Another purpose of the present invention is to achieve a cooling plant which is easy to manage, which uses in an innovative way mostly components which are already present in traditional plants, and which does not require long and burdensome maintenance interventions.

The Applicant has devised and embodied the present invention in order to provide an efficient, economical cooling plant, which is easy to construct and to maintain.

The plant according to the invention comprises at least a heat exchanger, to cool the fluid to be cooled, by means of heat exchange with a cooling fluid inserted in a cooling unit, of a substantially conventional type, comprising a cooling circuit able to feed the cooling fluid to the heat exchanger. The cooling unit comprises at least a condenser device, able to take the cooling fluid to within desired parameters of pressure and/or temperature.

According to a characteristic feature of the present invention, the plant comprises regulation means able to detect the temperature of the fluid to be controlled (input), and consequently to act on the condenser device, varying the power of condensation thereof (output).

The purpose of the present invention is to keep the temperature of the fluid to be controlled (which can be, according to the case, the "cooled" or the "cooling" fluid) at a substantially constant value and corresponding to the pre-established temperature value, by regulating the condensation capacity by means of a temperature sensor positioned in a position other than the walls of the delivery circuit.

The variation/regulation of the parameters of pressure and/or temperature of the fluid controlled, performed on the condenser element, exploits the characteristic proper to the capillary cooling cycle, in which the ratio between the condensation pressure and the evaporation pressure is substantially constant and depends only on the design parameters and/or setting parameters of a expansion member.

In this way, when a variation is detected in the temperature of the fluid to be cooled circulating in the user circuit, caused by variations in temperature and/or pressure and/or delivery of the fluid to be cooled, it is possible to correct this variation, by varying the pressure/temperature of evaporation, simply by varying the pressure and/or temperature of condensation.

In fact, in a constant expansion plant, such as a capillary type, a variation in the condensation pressure entails a consequent variation in the evaporation pressure and hence a correlated variation in the cooling capacity of the cooling unit proportional to the quantity of calories necessary to keep the temperature of the fluid to be cooled at the constant value set.

In a preferential form of embodiment, the regulation means comprise a detection element, such as for example a probe, located near the fluid to be controlled, and connected to a command device, such as for example a thermostat, a sophisticated electronic card or other, associated with command means, of the ON/OFF type or the speed variation type, of the ventilator of the condenser. This system of control and regulation allows to vary the pressure of the cooling fluid at outlet from the condenser by switching the ventilator off/on or by varying its speed of rotation, until the probe of the thermostat, or of the electronic card, signals that the temperature of the fluid to be cooled has returned to the pre-established value.

This solution has the substantial advantage that the circuit is extremely simple and that the response time when the variables of delivery and/or temperature and/or pressure of the fluid to be cooled vary is extremely rapid.

According to a variant, the condenser is of the liquid bath type, and the thermostat is connected to a device that regulates the delivery of the cooling fluid; when this is varied, we intervene, in a correlated manner, in the value of pressure at outlet from the condenser until the thermostat signals that the correct temperature of the user circuit has been reached.

According to another variant, the regulation means comprise a pressure switch connected at inlet or outlet to/from the heat exchanger, able to control the condensation pressure, so as to keep constant the evaporation pressure simply by varying the condensation pressure by acting on the control of the ventilator of the condenser.

It is obvious that in conditions of low delivery and temperature of the fluid to be cooled, the time for which the ventilator is off can be extended, which also entails a considerable energy saving.

The plant according to the present invention, given its simplicity, is thus easy to manage and does not require long and burdensome maintenance interventions by specialized personnel.

Another advantage of the present invention is that it is sufficient to detect only one parameter of the fluid to be cooled, thus preventing problems of coordination and delay both in the intervention itself and also in achieving the effects of the intervention.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF A PREFERENTIAL EMBODIMENT OF THE INVENTION

Figure 1:
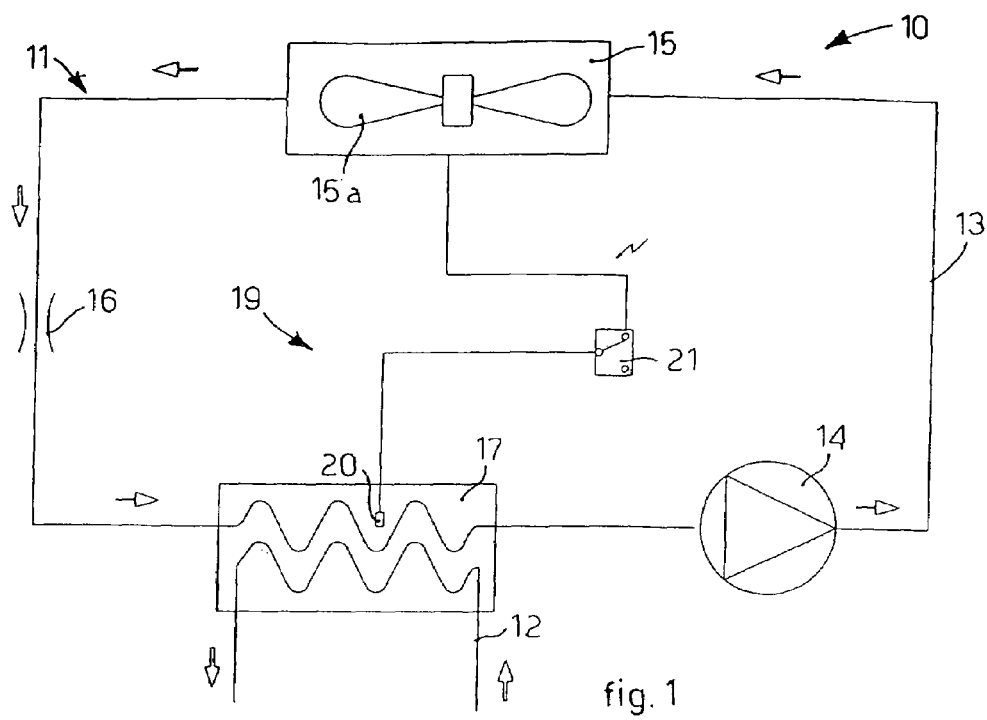
FIG. 1 is a schematic view of a cooling plant for a fluid according to the present invention.

A cooling plant 10 according to the invention, shown schematically in FIG. 1, comprises in its essential parts a cooling unit 11 and a user circuit 12, inside which a fluid to be cooled circulates.

To be more exact, the cooling unit 11 comprises a cooling circuit 13, in which a cooling fluid circulates, a compressor 14, a condenser 15, a expansion device or capillary 16, and a heat exchanger or evaporator 17, with which the user circuit 12 is partly associated.

The compressor 14 is of a substantially known type, and is able to ensure the circulation of the cooling fluid inside the cooling circuit 13, with a desired initial pressure.

The condenser 15 is also of a substantially known type, is disposed downstream of the compressor 14 and, in this case, is provided with a ventilator 15a, motorized, by means of which it cools the cooling fluid sent under pressure by the compressor 14.

Figure 2:
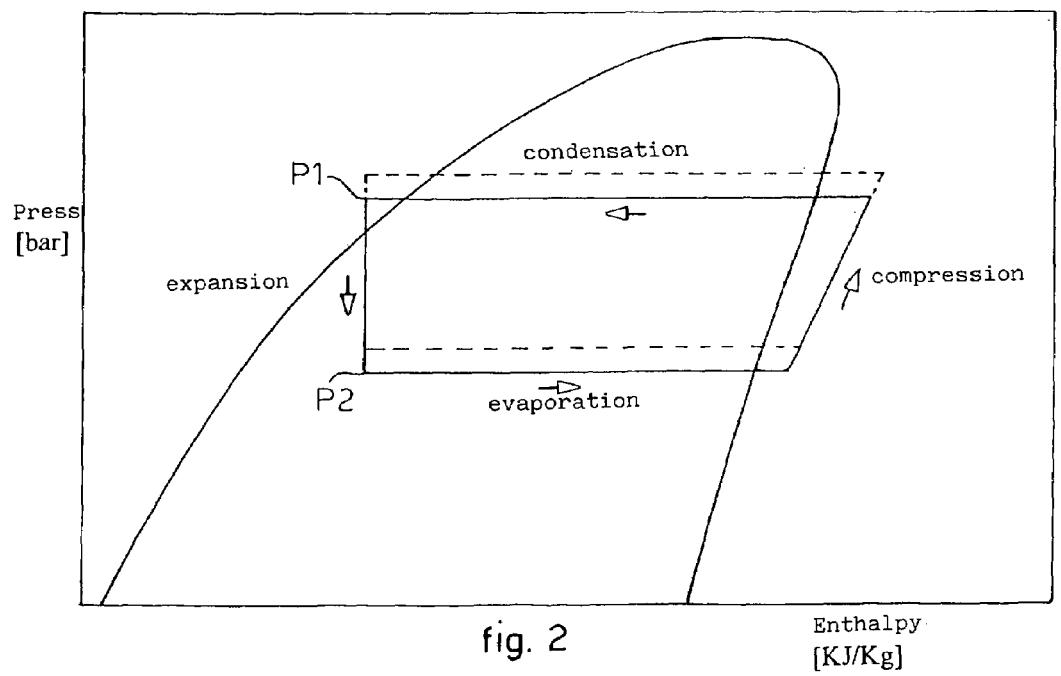
FIG. 2 is a graph of the functioning of the cooling plant in FIG. 1 in an operating condition.

The capillary 16 is also of a substantially known type and is able to effect an expansion or to reduce the pressure of the cooling fluid from a first value P1 to a second value P2, according to pre-established functioning parameters of the heat cycle to be performed (FIG. 2). In this way, as is known, the ratio between the condensation pressure and the evaporation pressure of the cooling fluid is substantially constant.

The evaporator 17 is also of a substantially known type, and is able to allow the heat exchange between the cooling fluid present in the cooling circuit 13, and the fluid to be cooled present in the user circuit 12. The evaporator 17 can be either of the direct heat exchange type, or the indirect heat exchange type, depending on the functioning needs and parameters of the plant.

According to a characteristic feature of the present invention, the cooling plant 10 also comprises a regulation unit 19 (FIG. 1) provided with at least a probe 20 connected to a thermostat or electronic card 21 which electronically controls the ventilator 15a of the condenser 15.

The probe 20 can be disposed inside, downstream or at a specific point of the evaporator 17 to be controlled, and detects the temperature of the fluid to be cooled that is flowing in the user circuit 12. The temperature thus detected is compared with pre-established temperature values, for example, in the case of a compressed air drier at about 3° C., so as to prevent the condensation present in the air from freezing.

By exploiting said constant ratio between the condensation pressure and the evaporation pressure, the thermostat or electronic card 21 intervenes on the motor of the ventilator 15a of the condenser 15, so as to increase, reduce or temporarily stop the rotation thereof, and hence to vary the values of temperature and pressure of the cooling fluid at outlet from the condenser 15. In this way, the temperature and pressure of the cooling fluid in correspondence with the evaporator 17 are also proportionally varied, and consequently, of the fluid to be cooled in the user circuit 12.

The cooling plant 10 according to the present invention functions as follows.

During the normal functioning of the cooling plant 10, the cooling unit 11 is active, the cooling fluid circulates through the cooling circuit 13 and, by means of the evaporator 17, progressively lowers the temperature of the fluid to be cooled present in the user circuit 12, to a pre-established temperature; in the case of compressed air cooling occurs to the desired dew temperature.

When by means of the probe 20 the thermostat or electronic card 21 detects that said pre-established temperature has been reached, it acts on the motor of the ventilator 15a of the condenser 15, so as to vary the pressure/temperature of the cooling fluid inside the cooling circuit 13, and to keep constant, or at least within the desired parameters, the temperature of the fluid to be cooled present in the user circuit 12.

In the event that the probe 20 of the thermostat or electronic card 21 detects that the temperature of the fluid inside the user circuit 12 is lower than said pre-established temperature, the thermostat or electronic card 21 switches off or slows down the motor of the ventilator 15a, determining an increase in the pressure values of the cooling cycle of the plant 10, as shown for example by the line of dashes in FIG. 2. On the contrary, when the probe 20 detects that the temperature of the fluid inside the user circuit 12 is higher than said pre-established temperature, by means of the thermostat or electronic card 21, the ventilator 15a is started, or its speed of rotation is increased, so as to re-establish the normal conditions of use, and keep the temperature reached constant.

According to a variant of the present invention, the intervention of the thermostat or electronic card 21 on the motor of the ventilator 15a of the condenser 15 can be proportional to the deviation between the pre-established temperature and the temperature actually detected, so as to optimize energy consumption and improve the performance of the cooling plant 10.

It is clear that modifications or additions may be made to the cooling plant 10 as described heretofore, without departing from the field and scope of the present invention.

It comes within the field of the present invention, for example, to provide that the condenser 15 can be of the liquid bath type, instead of provided with a ventilator 15a. In this case, the thermostat or electronic card 21 can be for example associated with a member to regulate the delivery of the cooling fluid entering the condenser 15, so that a variation in said delivery determines, in a correlated manner, the variation in pressure at outlet from the condenser, and consequently causes the pre-established temperature value of the fluid to be cooled to be maintained.

It also comes within the field of the present invention to provide that other traditional systems to regulate the cooling capacity, such as regulation valves, can be combined with the cooling circuit 13, in the event that the intervention on the condenser 15 alone were not to be sufficient to take the fluid to be cooled to the pre-established temperature.

According to another variant, two or more evaporators 17 can be provided on the cooling circuit 13, so as to be able to effect progressive steps of cooling and/or drying of the fluid to be cooled. It is also clear that, although the description refers to a specific example, a person of skill in the art shall be able to achieve other equivalent forms of cooling plant, all coming within the field of protection of the invention.

The invention claimed is:

1. Cooling plant for a "cooled" fluid, able to cool and/or dry said "cooled" fluid by means of cooling substantially to a pre-established temperature, said plant comprising at least:
   a cooling unit comprising a cooling circuit, and
   a heat exchanger, to cool said "cooled" fluid, by heat exchange with a "cooling" fluid inserted in said cooling unit comprising said cooling circuit, said cooling circuit able to feed said cooling fluid to said heat exchanger,
   said cooling unit comprising at least:
      a condensation device, provided with a ventilator having a motor, and able to take said cooling fluid to within desired parameters of pressure and/or temperature,
      a compressor device able to put said cooling fluid in circulation inside said cooling circuit,
      an expansion device, disposed between said condensation device and said heat exchanger and able to reduce the pressure of said cooling fluid from a first value to a second value to maintain the ratio between the condensation pressure and the evaporation pressure of said cooling fluid substantially constant, and
      regulation means able to detect a variation in the temperature of the "cooled" fluid and to act on said condensation device to vary the parameters of pressure and/or temperature of said cooling fluid,
   wherein said regulation means comprises a detection element disposed inside said heat exchanger to detect the temperature of said fluid to be controlled, and a command device connected to said detection element and at least to said condensation device to increase, reduce or temporarily stop the rotation of said motor of said ventilator to vary the pressure/temperature of evaporation by varying the pressure/temperature of condensation, to keep the temperature of the fluid to be cooled at the constant value set.

2. Cooling plant as in claim 1, wherein said regulation means comprise a pressure switch connected at inlet to or outlet from said heat exchanger and able to control the condensation pressure, to keep constant the evaporation pressure by varying the condensation pressure.

3. Cooling plant as in claim 1, wherein said regulation means comprises a probe to detect the temperature of the "cooled" fluid.

4. Cooling plant as in claim 1, wherein the expansion device is a capillary.

5. Cooling plant for a "cooled" fluid, able to cool and/or dry said "cooled" fluid by means of cooling substantially to a pre-established temperature, said plant comprising at least:
   a cooling unit comprising a cooling circuit, and
   a heat exchanger, to cool said "cooled" fluid, by heat exchange with a "cooling" fluid inserted in said cooling unit comprising said cooling circuit, said cooling circuit able to feed said cooling fluid to said heat exchanger;
   said cooling unit comprising at least:
      a condensation device, of a liquid bath type, and able to take said cooling fluid to within desired parameters of pressure and/or temperature,
      a compressor device able to put said cooling fluid in circulation inside said cooling circuit,
      an expansion device, disposed between said condensation device and said heat exchanger and able to reduce the pressure of said cooling fluid from a first value to a second value to maintain the ratio between the condensation pressure and the evaporation pressure of said cooling fluid substantially constant, and
      regulation means able to detect the temperature of a fluid to be controlled selected from the group consisting of the "cooled" fluid and the "cooling" fluid, and to act on said condensation device to vary the parameters of pressure and/or temperature of said cooling fluid,
   wherein said regulation means comprises a detection element disposed inside said heat exchanger to detect the temperature of said fluid to be controlled, and a command device connected to said detection element and at least to said condensation device to regulate the delivery of the cooling fluid entering the condenser to vary the pressure/temperature of evaporation by varying the pressure/temperature of condensation, to keep the temperature of the fluid to be cooled at the constant value set.

6. Cooling plant as in claim 5, wherein said regulation means comprise a pressure switch connected at inlet to or outlet from said heat exchanger and able to control the condensation pressure, to keep constant the evaporation pressure by varying the condensation pressure.

7. Cooling plant as in claim 5, wherein said regulation means comprises a probe to detect the temperature of the "cooled" fluid.

8. Cooling plant as in claim 5, wherein the expansion device is a capillary.

* * * * *